Sept. 25, 1962 R. A. CONRAD 3,055,407
EGG EVACUATING PROCESS AND A MEANS THEREFOR
Filed Jan. 15, 1960 7 Sheets-Sheet 1
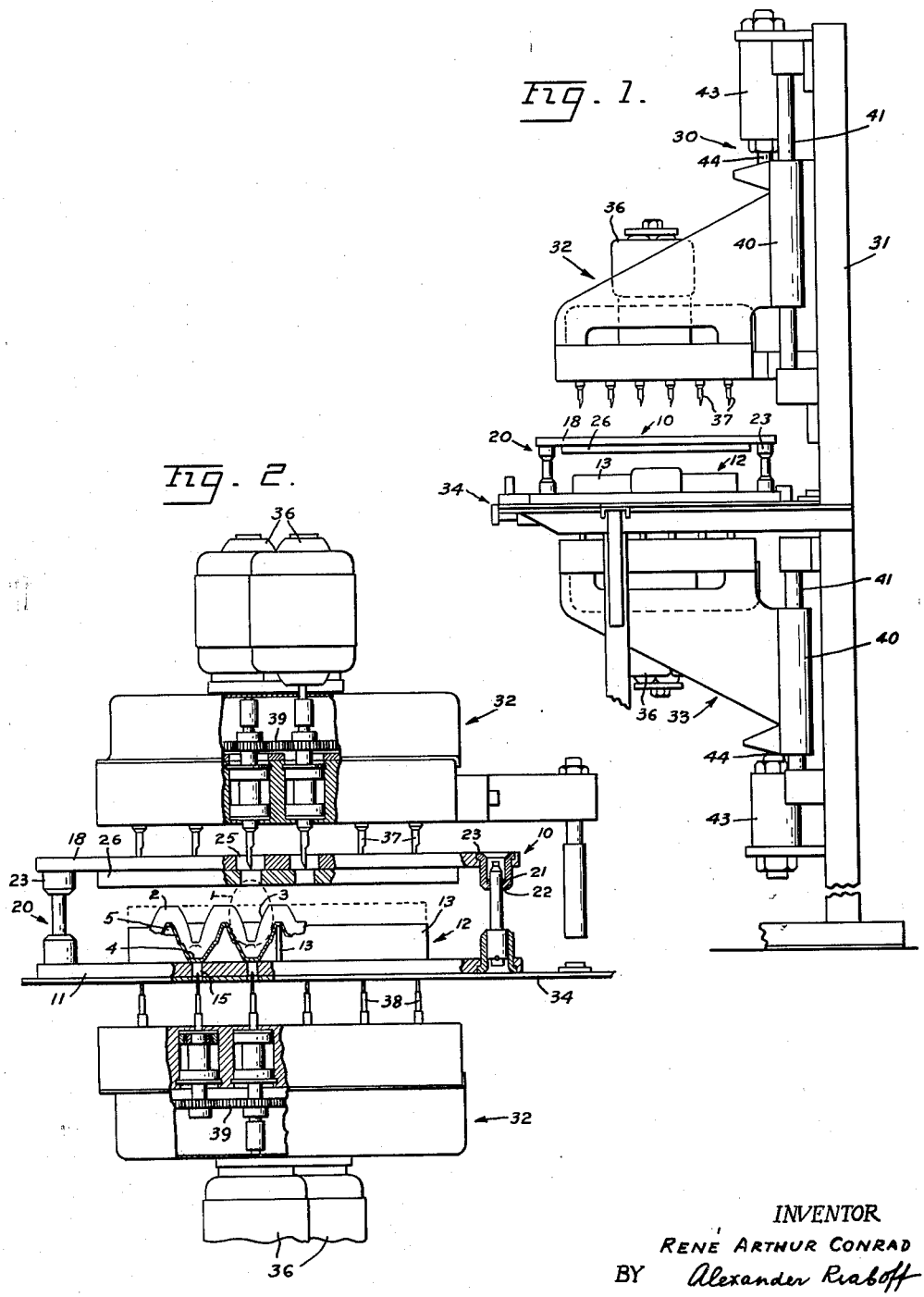
INVENTOR
RENE ARTHUR CONRAD
BY Alexander Riaboff
ATTORNEY Sept. 25, 1962 R. A. CONRAD 3,055,407
EGG EVACUATING PROCESS AND A MEANS THEREFOR
Filed Jan. 15, 1960 7 Sheets-Sheet 2

INVENTOR.
RENÉ ARTHUR CONRAD
BY Alexander Rieboff
ATTORNEY

Sept. 25, 1962  R. A. CONRAD  3,055,407
EGG EVACUATING PROCESS AND A MEANS THEREFOR
Filed Jan. 15, 1960  7 Sheets-Sheet 3
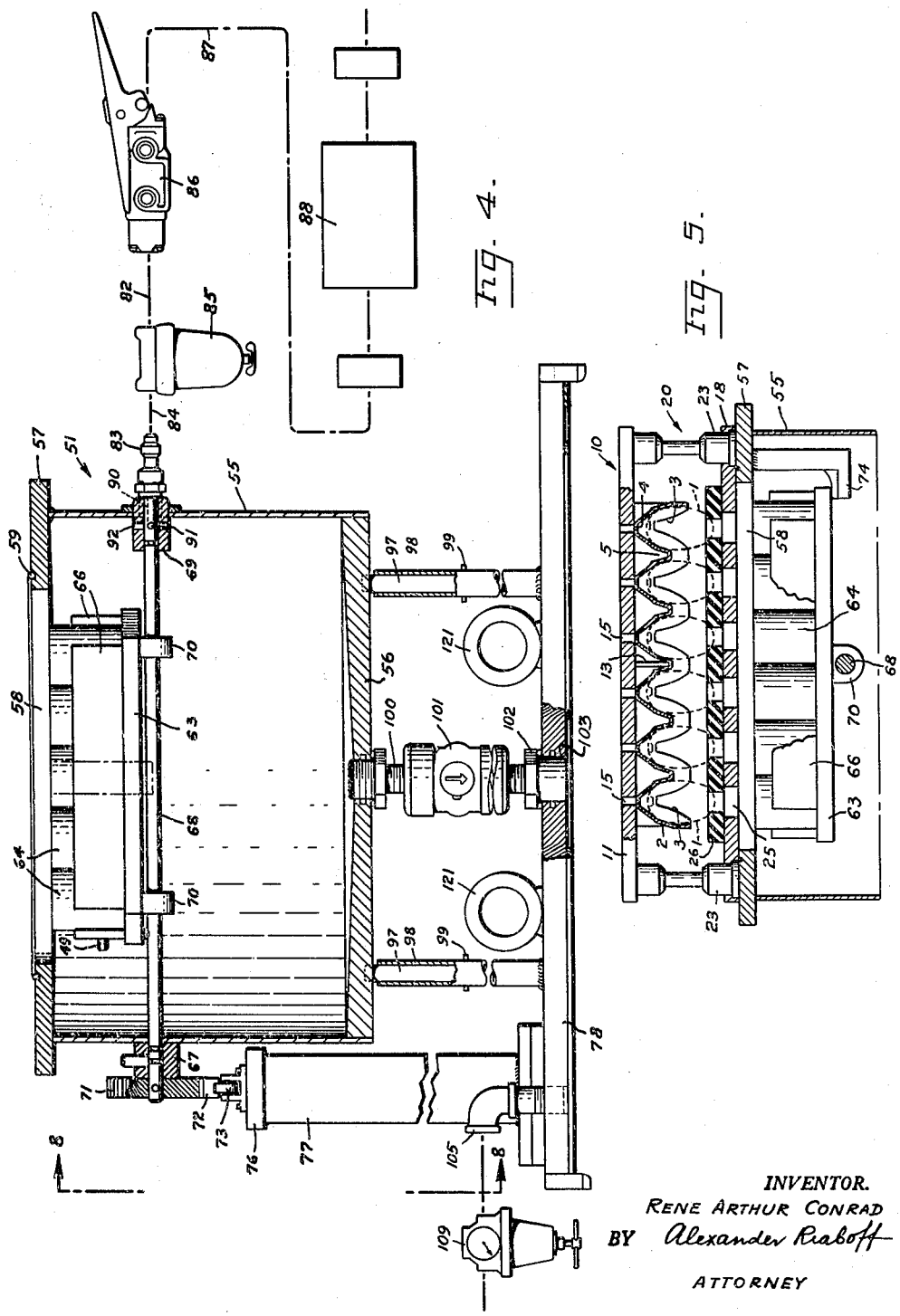
INVENTOR.
RENE ARTHUR CONRAD
BY Alexander Riaboff
ATTORNEY Sept. 25, 1962 R. A. CONRAD 3,055,407
EGG EVACUATING PROCESS AND A MEANS THEREFOR
Filed Jan. 15, 1960 7 Sheets-Sheet 4
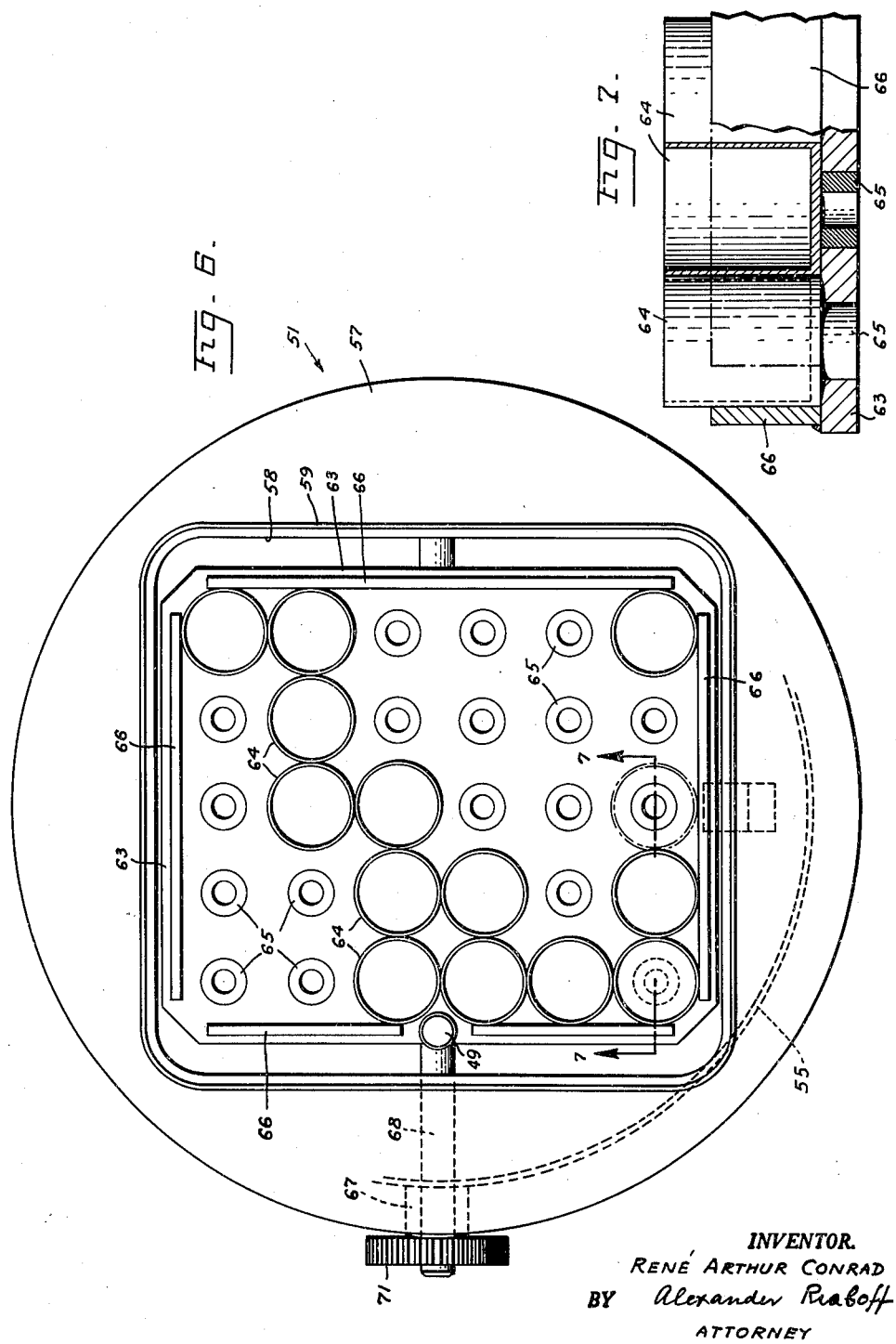
INVENTOR.
RENÉ ARTHUR CONRAD
BY Alexander Riaboff
ATTORNEY

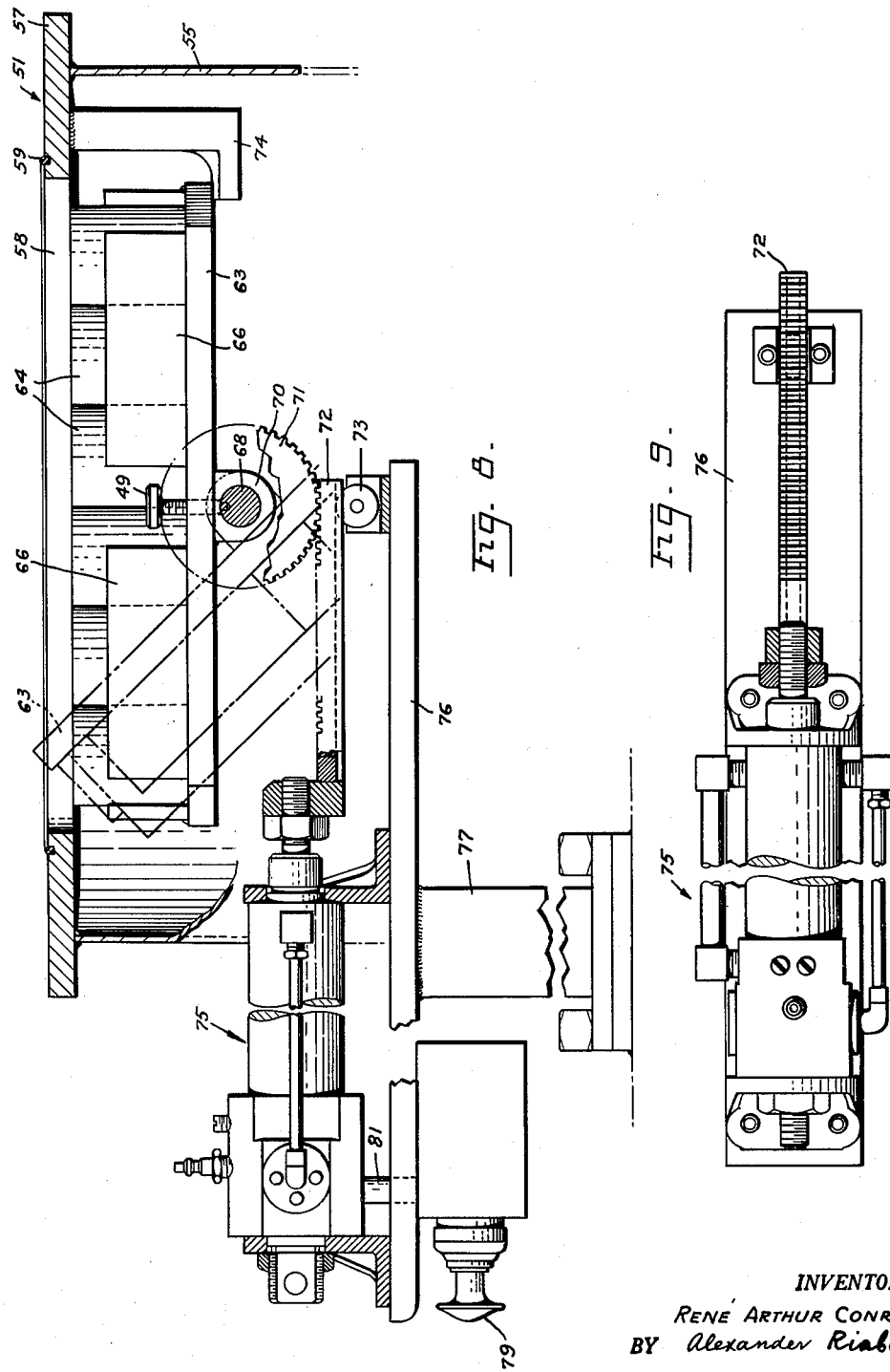

Sept. 25, 1962        R. A. CONRAD        3,055,407

EGG EVACUATING PROCESS AND A MEANS THEREFOR

Filed Jan. 15, 1960        7 Sheets-Sheet 6

INVENTOR.
RENE ARTHUR CONRAD
BY *Alexander Riaboff*
ATTORNEY

Sept. 25, 1962  R. A. CONRAD  3,055,407
EGG EVACUATING PROCESS AND A MEANS THEREFOR
Filed Jan. 15, 1960  7 Sheets-Sheet 7

INVENTOR
RENÉ ARTHUR CONRAD
BY Alexander Riaboff
ATTORNEY

United States Patent Office 3,055,407
Patented Sept. 25, 1962

3,055,407
EGG EVACUATING PROCESS AND A MEANS THEREFOR
René Arthur Conrad, 2510 Humphrey Ave., Richmond, Calif.
Filed Jan. 15, 1960, Ser. No. 2,696
3 Claims. (Cl. 146—2)

This invention relates to an egg evacuating process and a means therefor.

This application is a continuation-in-part of my copending application Serial No. 855,215, filed on November 24, 1959 for an Egg Drilling Machine.

The primary object of this invention is to provide a new process for evacuating simultaneously a plurality of eggs for commercial purposes and also to provide necessary machinery therefor.

Another object of this invention is to provide a new process in which a plurality of eggs are drilled on both ends in such a way as to prevent losing the contents thereof while the eggs are moved from an egg drilling machine to an egg evacuating machine.

Another object of this invention is to provide the process as above described in which a large hole is drilled on the upper end and a small shallow hole on the lower end of eggs and the same are moved to an egg evacuating machine where the eggs are turned over and evacuated through the large holes.

Another object of this invention is to provide the process as above described in which the eggs are evacuated into individual cups, whereupon the contents of each cup are inspected, the cups with unsatisfactory contents are removed, and the remaining cups are emptied into a common receptacle.

Another object of this invention is to provide a device for evacuating of a plurality of eggs simultaneously into individual cups wherein the contents of each cup are inspected and those found unsatisfactory are removed, and the rest of cups are emptied in a common receptacle.

Other objects and advantages will appear as the specification proceeds and the novel features of the device will be particularly pointed out in the claims hereto annexed.

In this specification and the annexed drawing, the invention is illustrated in the form considered to be the best but it is understood, that the invention is not limited to such form; and it is also to be understood that in and by the claims following the description, it is desired to cover the invention in whatsoever form it may be embodied.

This invention is illustrated in the drawings forming a part of the specification in which:

FIG. 1 is a side elevation view of the egg drilling machine.

FIG. 2 is an enlarged partial front view of the egg drilling machine.

FIG. 4 is a central vertical cross-section through the evacuator.

FIG. 5 is a vertical cross-section through the top of said evacuator showing the egg retaining device thereon.

FIG. 6 is a top plan view of the evacuator receptacle.

FIG. 7 is a vertical cross-section through some of the cups and the platform supporting the same, taken along the line 7—7 of FIG. 6.

FIG. 8 is a side view of said evacuator, some parts being shown in section, as seen from the line 8—8 of FIG. 4.

FIG. 9 is a top plan view of the pneumatic cylinder and rack.

Figure 3:
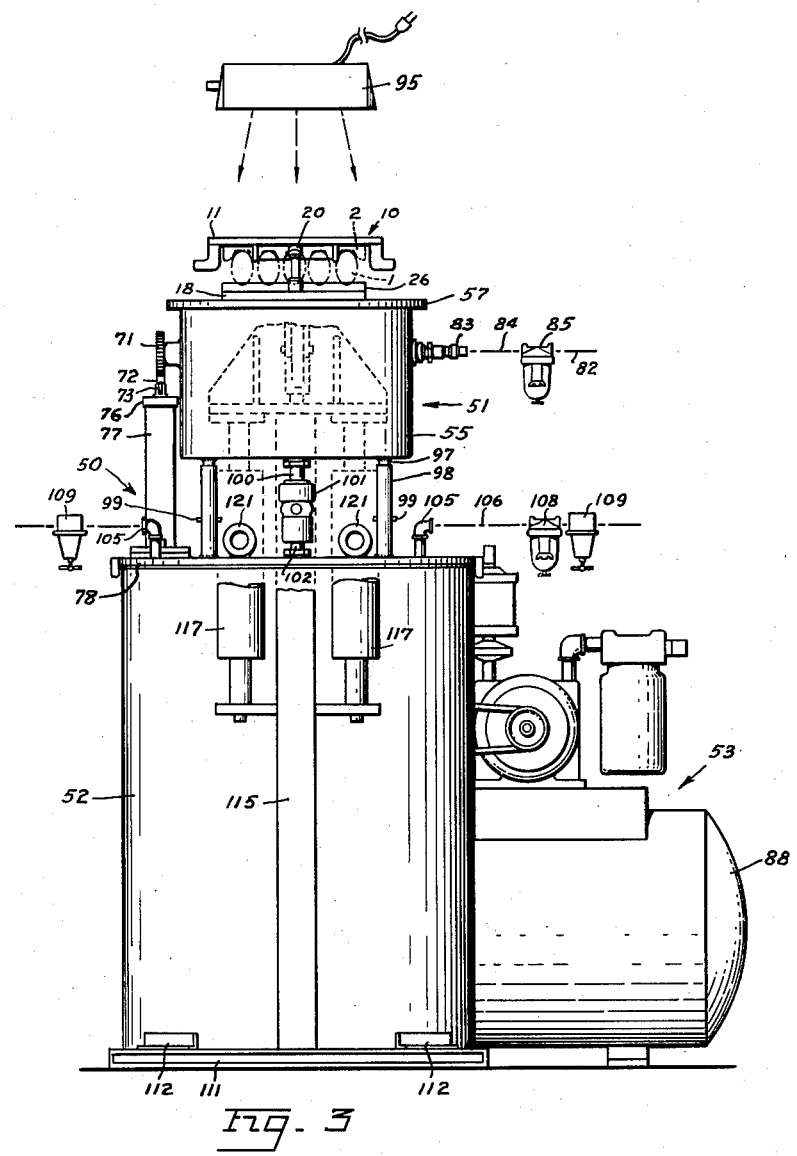
FIG. 3 is a front elevation view of the egg evacuating machine.

In detail, the egg evacuaing process includes the steps and employs the devices and machinery as follows:

Eggs 1 are placed in a carton 2 which is open on the top and consists of a plurality of cells 3, each accommodating one egg. The cells are preferably arranged in six rows, there being five cells in a row. The rows are separated one from another by passages 5.

The carton 2 is placed into an egg retaining device 10 for drilling and evacuating processes. The device 10 comprises a bottom plate 11 upon which a carton centering cross 12 is arranged. The latter consists of two vertical strips 13 intersecting each other at the right angle, which strips enter the passages 5 between the rows of cells 3 in the carton 2, thus centering the same in relation to said plate. The latter is provided with a plurality of openings 15, each located opposite a respective egg in the carton 2, through which holes said eggs are drilled from the bottom, the drills passing through cell bottoms 4.

The device 10 also includes an upper plate 18 which is removably connected to the bottom plate 11 by a pair of pip pins 20, described in the above referred to copending patent application. The pip pins 20 permit quick disengagement of the upper plates by pressing the tops of said pins, whereby balls 21 protruding outwardly from said pin and engaging a lip 22 of an upper sleeve 23 are allowed to move into the pin thus permitting the upper sleeve 23 to be slipped upwardly off the pin. The sleeves 23 are pressed into the plate 18.

The upper plate is also provided with a plurality of openings 25 located opposite the respective eggs in said carton through which the upper ends of said eggs are drilled. The lower side of said upper plate is covered with a layer of foam rubber 26 secured thereto which is perforated opposite said openings 25. When the carton of eggs is placed on said device, the foam rubber 26 rests on the tops of eggs 1, thus steadying the eggs during the drilling operation.

The eggs 1 are drilled in an egg drilling machine 30 which comprises the subject matter of said copending application, Serial No. 855,215, dated November 24, 1959, wherein the same is described in detail. It comprises a frame 31 slidably supporting an upper drilling unit 32 and a lower drilling unit 33, and a table 34 therebetween.

Each of said drilling units carries a pair of electric motors 36 which rotate upper drills 37 and lower drills 38 through gear trains 39. The units 32 and 33 are secured to sleeves 40 slidable on shafts 41 and are moved toward the table and away therefrom by pneumatic cylinders 43, one end of which is secured to said frame. An operating shaft 44 extends from the other end of said cylinder and is connected to a respective unit. The up and down movements of said units are synchronized so that the eggs are drilled simultaneously on both ends.

The upper drills 37 are of considerably larger diameter than the lower drills 38, the first being 3/16" and the second 1/16" diameter and therefore the top holes in said eggs are considerably bigger than the lower holes. Furthermore, the lower drills 38 penetrate the egg membrane slightly and for that reason the eggs do not leak while being taken from the egg drilling machine 30 to an egg evacuating machine 50. If, however, the drilled egg starts to leak, it will trickle very slowly due to the small diameter of the hole and slight penetration of the drill.

The egg evacuating machine 50 comprises an evacuator 51, a collector reservoir 52 located under said evacuator into which the contents of the eggs are passed therefrom, and a vacuum system 53 used in connection thereto.

The evacuator 51 consists of a receptacle 55, cylindrical in form, having a concave bottom 56 and covered with a top 57. The latter is provided with a central square opening 58 surrounded by a rubber ring 59 inserted in the top and protruding slightly about its upper surface.

A rotatable platform 63 is arranged inside of said receptacle. The platform is of slightly smaller dimensions than the opening 58 and normally occupies a horizontal position right under the same. It carries a plurality of cups 64 which are preferably made of stainless steel, and may be made of some light metal, or plastic, and have a steel insert in the bottom thereof.

Under each cup 64 a magnet 65 in form of a heavy ring is pressed into said platform to hold securely said cup on the surface thereof by magnetic force, but may be removed manually from said platform 63. The cups are preferably of such size as to abut each other and border guards 66.

The platform 63 is supported by a shaft 68 passing diametrically through said receptacle parallel to the top 57 and journalled in bushings 67 and 69 secured to said receptacle. The shaft 68 passes through a pair of ears 70 extending from the lower side of the platform 63 and is releasably connected thereto by a spring pressed catch 49 carried by said platform, the lower end of which catch enters a dent in said shaft.

The shaft 68 extends beyond the bushing 67 and carries on its end a spur gear 71, which meshes with, and is operable by, a rack 72 slidable over a roller 73. When the rack 72 moves forth and back, it rotates the gear 71, shaft 68, platform 63 and the cups 64 through an arc about 135°, thus emptying the contents of the cups into the receptacle and returning the platform to its normal position, wherein one side thereof rests on a hook 74 extending from the top 57.

The rack 72 is operated by an automatic air cylinder 75. The latter and the above mentioned roller 73 are carried by a support 76 secured to the top of a column 77, the base of which is attached to the top 78 of the collector reservoir 52.

The air cylinder 75 in a standard product made by Allen Air Corporation of Mineola, N.Y. and sold under the name of Allen Air Valve-in-head Cylinder, Model VCR, and described in detail in their catalogue.

It is operated by compressed air introduced into said cylinder through a manually operated valve 79 secured to the bottom of the support 76 and connected with said cylinder by a pipe 81. Compressed air is supplied to the valve 79 from a source not shown.

The cylinder 75 operates a follows: compressed air is introduced into the head of said cylinder by pressing the valve 79, and pushes the piston inside said cylinder and the shaft secured thereto to the left viewing FIG. 8, thus pushing the rack 71 and rotating the gear 70 and shaft 68. When the piston reaches its maximum position it pushes a valve located at its base and allows compressed air to operate a mechanism in the cylinder head to open a passage for compressed air to the base on the other side of the piston, thus pushing the latter to its inital position. This returns the rack 71, the gear 70 and the shaft 68 to their initial positions also.

The bushing 69 passes through the wall of the receptacle 55 and has a plug 83 secured thereto which is connected by a tube 84 to an air filter 85, a tube 82 connecting said filter wtih a foot operated three-way valve 86, and a tube 87 connecting said valve with a vacuum tank 88.

An air passage 90 is arranged in the end of the shaft 68 terminating with a plurality of transverse openings 91. The bushing 69 is formed with a pair of bores 92, located in the plane of said openings and normally communicating therewith.

The evacuator 51 operates as follows:

The egg retaining device 10, containing a carton 2 of drilled eggs, is delivered to the egg evacuating machine 50. The operator turns said device 10 upside down and places the same on the rubber ring 59 on the top 57 of the receptacle 55 so that the upper plate 18 covers the opening 58 and the sides of said plate are parallel to the sides of said opening. The eggs now rest on the foam rubber 26 secured to said upper plate. Thereafter the operator presses by his foot the valve 86 which puts the receptacle 55 in communication with the source of vacuum, thus creating a low vacuum in said receptacle. The vacuum is only sufficient to suck the contents of each egg through the large openings therein into the cups 64 located on the platform 63 under said eggs.

Then the operator puts the valve 86 in neutral, takes the device 10 off the top 57 and inspects the contents of each cup. An ultra-violet lamp 95 is provided over said receptacle which permits to determine at a sight whether there is a bad egg in said cups. The cups 64 containing bad eggs are removed from the platform and thereupon the valve 79 is pressed which operates the cylinder 75, which in turn moves the rack 72, rotates the shaft 68 with the platform 63 and, thus, empties the remaining cups 64 into the receptacle.

The receptacle 55 is supported by a pair of vertical rods 97 secured to the bottom 56 thereof, which rods are slidable in vertical sleeves 98 secured to the top 78 of the collector reservoir 52. A pin 99 passes through each of said sleeves and the respective rod to keep said receptacle firmly connected with said top.

A passage is provided between the receptacle 55 and the reservoir 52 in form a pipe 100, a check valve 101 and a fitting 102 which is slidable in the hole 103 in the top 78. A very low vacuum is maintained in said reservoir through an elbow 105 on the top 78, a pipe 106, an air filter 108 and a check valve 109 which are interconnected and operatively connected to the source of vacuum.

Intermittently the contents of the receptacle are withdrawn into the reservoir. When the latter is filled to a desirable level, the reservoir 52 is moved away and a new one is placed in its stead.

Figure 11:
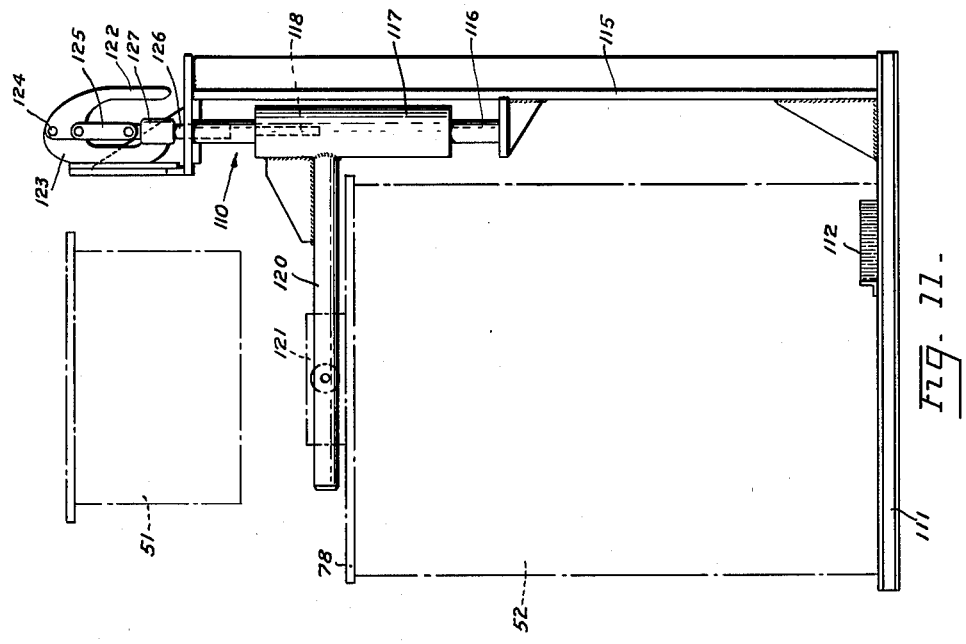
FIG. 11 is a side elevation view of the lifter shown in FIG. 10.
Figure 10:
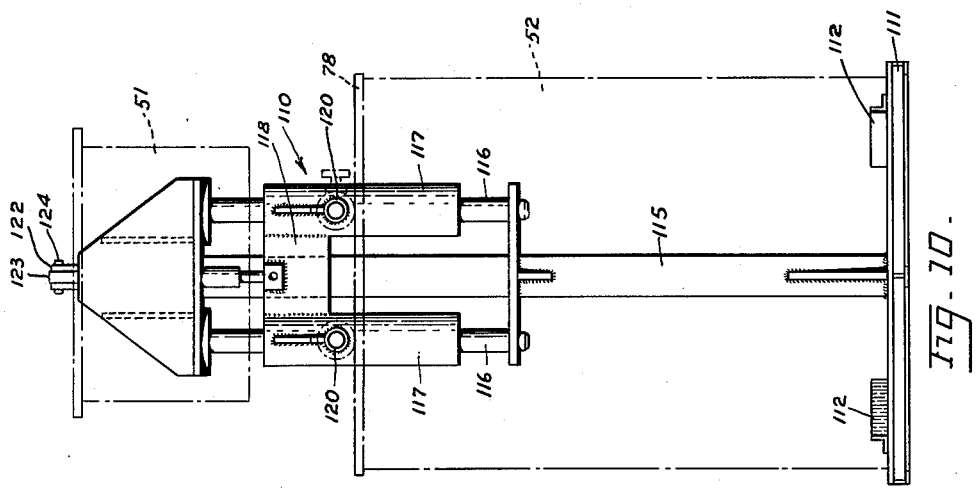
FIG. 10 is a front elevation view of the container top lifter.

A special top lifter 110, shown in FIGS. 10 and 11, is provided for raising the top 78 with the evacuator 51 resting thereon. The lifter 110 consists of a large base 111 on which said reservoir 52 stands. The latter is placed on said base against a pair of rounded stops 112 which locate the reservoir exactly under said top 78. A post 115 extends upwardly from said base 111, which post carries a pair of vertical rods 116 secured thereto on each side thereof. Each rod 116 has slidably arranged thereon a slide 117, the slides being connected by a plate 118. A round bar 120 extends forwardly from each of said slides and passes through a round ear 121 secured to said top 78.

The slides 117 are moved up and down by a handle 122 which is swingably secured to a support 123 at 124. The handle 122 is also connected to a link 125 which with said handle forms a toggle joint. The lower end of said links is attached to the top of a shaft 126 which passes through a bushing 127, secured to said support 123. The lower end of said shaft is connected to the plate 118. When the handle 122 is raised upwardly, it pulls the link 125 upwardly and thus raises the slides 117 and the bars 120 and lifts the top 78 with the evacuator 51 off the reservoir 52 whereupon the latter may be pulled out and an empty reservoir is placed in its stead.

Figure 12:
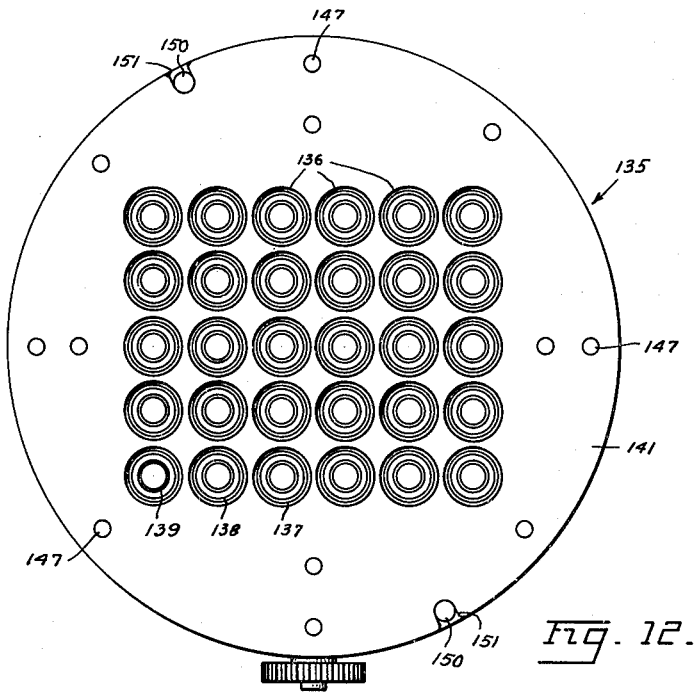
FIG. 12 is a plan view of a modified form of the egg retaining device resting on the egg evacuator.
Figure 13:
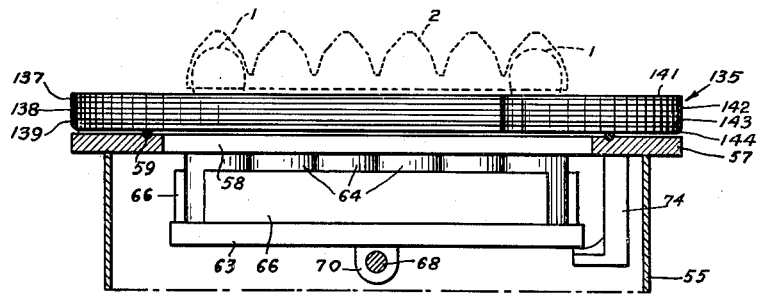
FIG. 13 is a vertical central cross-section through the top of the evacuator showing the modified egg retaining device in elevation.
Figure 14:
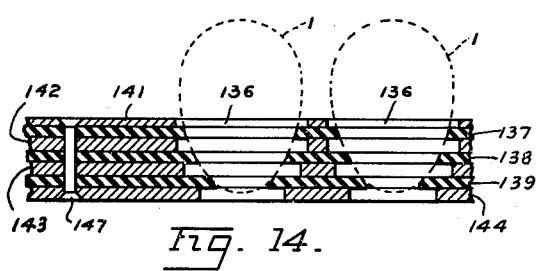
FIG. 14 is a partial vertical cross-section through the modified egg retaining device taken along the section line 14—14 of FIG. 12.

FIGS. 12–14 show a modified form of an egg retaining device 135. The latter is in form of a disk and has a plurality of round openings 136 for holding eggs therein. The device 135 consists of a plurality of rubber sealing layers 137, 138 and 139, separated and covered by metal plates 141, 142, 143 and 144. The openings 136 are not uniform in diameter, but each succeeding rubber layer has a hole of progressively smaller diameter beginning from the top interspaced by said metal plates also having holes of progressively smaller diameter, so that an egg placed in said opening 136 contacts each of said rubber layers and hermetically closes the opening. The rubber layers and the metal plates are held together by a plurality of rivets 147 passing therethrough. The device is centered on the egg evacuating machine 50 by a pair of pins 150 provided on the top 57 of said evacuator, entering notches 151 on the device.

The egg retaining device 135 is used only on the evacuating machine 50. Eggs in the cartons 2 are drilled on the drilling machine 30. The cartons 2 may be centered and retained by the egg retaining device 10 while the eggs are drilled, or some other device or method may be used to retain the eggs while the same are drilled. After the drilling operation is completed, the cartons 2 with the eggs are moved to the egg evacuating machine 50, wherein the device 135 is placed on the carton 2 and both are turned over and the device 135 is placed on the egg evacuating machine. The device 135 being below the eggs is placed directly on the top 57 of the evacuator 51, where it is centered by the pins 150. The eggs are evacuated as above described. Thereupon the device 135 is turned over so that the carton 2 is under the device, and the carton and the egg shells are disposed of.

The provision of a small hole in eggs as air inlet is of considerable importance as it permits controlled evacuation of eggs and also permits to maintain substantially the same vacuum in the evacuator 55 in spite of the fact that some of the eggs may be evacuated a little faster than the others, as the side of the hole limits the amount of air entering the evacuator and therefore the evacuation of eggs proceeds in unison and takes place substantially at the same time.

In case of processing cracked eggs the vacuum is reduced to avoid collapsing of the shells in the egg retaining device 135, in which case the collapsed shells fall into the cups 64, leaving the openings 136 in the egg retaining device 135 open and permitting air to enter freely the evacuating chamber 55.

The provision of the small hole in eggs as air inlet made the multi-egg evacuating process possible and practical.

I claim:

1. An egg evacuating machine for eggs placed in an egg retaining device and drilled on both ends, comprising: a receptacle closed by a top having an opening therein adapted to be closed by said egg retaining device when the same is placed on said top, a platform rotatably arranged under said opening inside said receptacle, a plurality of cups removably retained by said platform, each cup being located under a respective egg in said device, when the latter rests on said top, means for creating partial vacuum in said receptacle sufficient to draw the contents of the eggs into respective cups for inspection and elimination of the cups the contents of which appear unsatisfactory, and means for turning said platform for emptying the contents of the remaining cups into the receptacle.

2. The combination of an egg retaining device having a plate with a plurality of cushioned holes therein in which eggs drilled on both ends rest, with an egg evacuating machine comprising:
a receptacle closed by a top having an opening therein;
means on said top for centering said egg retaining device over said opening, said device closing said opening when properly placed on said top;
a shaft extending substantially through the center of said receptacle and piercing the walls thereof by both ends;
a platform under said opening secured to said shaft in a horizontal position;
a plurality of cups on said platform, each cup being placed under a respective egg hole in said egg retaining device, said cups being removably retained by said platform for rotation with said platform and shaft;
means in one end of said shaft for introducing vacuum in said receptacle for drawing the contents of said eggs in their respective cups, whereupon the egg retaining device is removed from the top of said receptacle, the contents of each cup inspected and the cups with unsatisfactory eggs are removed;
means operatively connected to the other end of said shaft for rotating the shaft, platform and the remaining cups through an arc of about 180° for emptying the contents of said remaining cups into the receptacle, and for returning said platform to its horizontal position.

3. The combination of an egg retaining device having a plate with a plurality of cushioned holes therein in which eggs, drilled on both ends, rest, with an egg evacuating machine comprising:
a closed receptacle with a flat top having a hole therein;
means on said top for centering the egg retaining device in relation to said hole, said device closing said opening when properly placed on said top;
means on said top for making airtight contact between said receptacle and top around said hole;
a shaft extending substantially through the center of said receptacle and piercing the walls thereof by both ends;
a platform under said opening secured to said shaft which platform normally is in a horizontal position;
a plurality of cups on said platform, each cup being placed under a respective cushioned hole in the egg retaining device when the latter rests on the top of said receptacle;
magnetic means for removably retaining said cups on the platform;
a bearing on the inner wall of the receptacle for rotatably supporting one end of said shaft, said bearing and said shaft end having passages therein through which vacuum is introduced in the receptacle for drawing the contents of said eggs into their respective cups for inspection of the same after the removal of the egg retaining device from the top of the receptacle and for removing the cups with unsatisfactory egg contents; and
means operatively connected to the other end of said shaft for rotating the shaft, platform and remaining cups through an arc of about 180° for emptying the contents of said remaining cups into the receptacle, and for returning said platform to its horizontal position.

References Cited in the file of this patent

UNITED STATES PATENTS

| | | |
|---|---|---|
| 498,488 | Power | May 30, 1893 |
| 1,496,312 | Harkin | June 3, 1924 |
| 2,445,490 | Meade | July 20, 1948 |
| 2,485,035 | Chensky | Oct. 18, 1949 |
| 2,507,667 | Haller | May 16, 1950 |
| 2,594,619 | Bosch et al. | Apr. 29, 1952 |
| 2,735,464 | Kerven | Feb. 21, 1956 |
| 2,760,537 | Willsey | Aug. 28, 1956 |